US011908425B2

(12) United States Patent
Ko et al.

(10) Patent No.: US 11,908,425 B2
(45) Date of Patent: Feb. 20, 2024

(54) ADAPTIVE GAMMA CONTROL TO SUPPRESS VARIABLE REFRESH RATE FLICKER

(71) Applicant: Dell Products L.P., Round Rock, TX (US)

(72) Inventors: Hyunseok Ko, Singapore (SG); Bongjun Lee, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/591,698

(22) Filed: Feb. 3, 2022

(65) Prior Publication Data

US 2023/0245629 A1 Aug. 3, 2023

(51) Int. Cl.
*G09G 3/36* (2006.01)
*G09G 3/34* (2006.01)

(52) U.S. Cl.
CPC ............. *G09G 3/36* (2013.01); *G09G 3/3406* (2013.01); *G09G 2320/0233* (2013.01); *G09G 2320/0242* (2013.01); *G09G 2320/0257* (2013.01); *G09G 2320/0673* (2013.01)

(58) Field of Classification Search
CPC ................... G09G 3/36; G09G 3/3406; G09G 2320/0257; G09G 2320/0242; G09G 2320/067; G09G 2320/0673
See application file for complete search history.

(56) References Cited

U.S. PATENT DOCUMENTS

| | | | | |
|---|---|---|---|---|
| 9,773,460 B2 | 9/2017 | Verbeure et al. | | |
| 9,786,255 B2 | 10/2017 | Verbeure et al. | | |
| 9,952,642 B2 | 4/2018 | Wang et al. | | |
| 10,210,845 B2 | 2/2019 | Glen et al. | | |
| 10,359,885 B2 | 7/2019 | Brahma et al. | | |
| 2014/0198138 A1* | 7/2014 | Nambi | G09G 3/36 | 345/87 |
| 2015/0109286 A1* | 4/2015 | Verbeure | G09G 3/3406 | 345/545 |
| 2017/0124934 A1* | 5/2017 | Verbeure | G09G 3/3611 | |
| 2018/0090084 A1* | 3/2018 | Zheng | G09G 3/3614 | |
| 2018/0302577 A1* | 10/2018 | Niitsuma | H04N 1/00891 | |

* cited by examiner

*Primary Examiner* — William Boddie
*Assistant Examiner* — Saifeldin E Elnafia
(74) *Attorney, Agent, or Firm* — ZAGORIN CAVE LLP; Robert W. Holland

(57) ABSTRACT

An information handling system presents visual images at a display through a scalar that adjusts the visual images with a gamma lookup table selected from plural gamma lookup tables based upon a refresh rate of the display. As a graphics processor commands variable refresh rates, a blanking period is used to adjust the refresh rates and a gamma lookup table selection is applied during the blanking period to encourage uniform luminance. Each gamma lookup table is stored in a separate SRAM and input to a multiplexor that uses the refresh rate to select which gamma adjusted visual image is presented at the display.

16 Claims, 9 Drawing Sheets

ADAPTIVE GAMMA CONTROL TO SUPPRESS VARIABLE REFRESH RATE FLICKER

BACKGROUND OF THE INVENTION

Field of the Invention

The present invention relates in general to the field of portable information handling systems, and more particularly to an information handling system dual pivot hinge signal path.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with processing components that execute instructions to generate visual images for presentation at a display. The processor provides visual information to a graphics processing unit (GPU) that further processes the information to generate pixel values that define presentation of a visual image at display pixels. For example, the GPU communicates pixel values to a display timing controller that in turn scans the pixel values to an array of pixels of a display panel. For instance, a liquid crystal display (LCD) panel includes an array of liquid crystal pixels having liquid crystal materials that filter color of a backlight based upon an electrical field applied to the liquid crystal material. As another example, organic light emitting diode (OLED) material generates different colors by applying the pixel values to apply current to the OLED material, resulting in illumination. A display also typically includes a scalar that performs a variety of single instruction operations on the pixel values to efficiently process the pixel values. For instance, a scalar is generally available to adjust a display resolution when the pixel values provided to the display do not match the resolution of the display pixel array.

Displays often have a variety of refresh rates at which the pixel data is applied to the pixels so that visual images appear to the human eye to have natural motion. High end displays that support gaming applications often have very rapid refresh rates to help present visual images with as little distortion or ghosting as possible. Some GPUs include an ability to command a display to vary refresh, known as a variable refresh rate (VRR). For instance, AMD's Freesync and Nvidia's Gsync mechanisms provide a dynamic refresh rate that changes the display refresh rate in response to rendering frame rate changes in gaming video content. Synchronizing changes in refresh rate with changes in rendering framerate prevents image tearing and stuttering. The display refresh rate is synchronized to the frame rate of rendering images by adjusting a vertical blanking period when the refresh rate change is applied.

In the case of LCD display panels that are "hold" type of display devices, the LCD panel holds the refreshed image during the vertical blanking associated with variable refresh rate changes until the next fresh or next frame. The longer the vertical blanking period, the more time generally needed for the LCD display panel to hold the charges at the pixels. This makes the LCD display panel more vulnerable to luminance change and can result in an end user experiencing a perception of luminance change as a flicker under certain conditions. Other types of displays, such as OLED displays, and applications other than gaming applications, may experience a similar flicker effect. The flicker effect can detract from an end user viewing experience at a display.

SUMMARY OF THE INVENTION

Therefore, a need has arisen for a system and method which support uniform luminance at a display during variable refresh rate operations.

In accordance with the present invention, a system and method are provided which substantially reduce the disadvantages and problems associated with previous methods and systems for presenting visual images at a display having variable refresh rate operations. Plural gamma lookup tables stored at a display scalar are selected to gamma adjust display pixel values based upon a refresh rate selected for the display. For example, a separate SRAM stores each separate gamma lookup table to support single instruction gamma adjustment of rendered visual information and the gamma adjusted visual information is selected for presentation at the display from the gamma lookup table associated with the selected refresh rate.

More specifically, an information handling system processes information with processing components disposed in a housing, such as a processor that executes instructions of an operating system and a gaming application to generate visual information in cooperation with a random access memory that stores the instructions and information. The visual information is communicated to a display, such as in pixel values provided from a graphics processor unit, along with a command to change the refresh rate of the display, such as to adapt to the framerate of a gaming application that generates the visual information. A scalar of the display receives rendered visual images from the graphics processing unit and commands to change the refresh rate of the display. The rendered visual image is applied against each of plural gamma lookup tables to generate plural inputs of a gamma adjusted rendered visual image to a multiplexor. The refresh rate is applied as a selector input to the multiplexor to select the gamma adjusted rendered visual image associated with the refresh rate selected to present the visual images.

The present invention provides a number of important technical advantages. One example of an important technical advantage is that a display presents visual images provided from an information at a variable refresh rate while maintaining a uniform luminance. The uniform luminance is supported by changing the gamma lookup table used to perform gamma correction as the refresh rate changes. The uniform luminance reduces any flicker effect that an end user might experience when a variable refresh rate is applied. The change of the gamma lookup table is applied during vertical blanking of the display between refresh rate commands to minimize viewing disruption and performed in real time with selection of several available gamma adjusted values made at a multiplexor.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system graphics processing unit commands variable refresh rates at a display having a scalar that applies a selected of plural gamma lookup tables to rendered images based upon the refresh rate. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
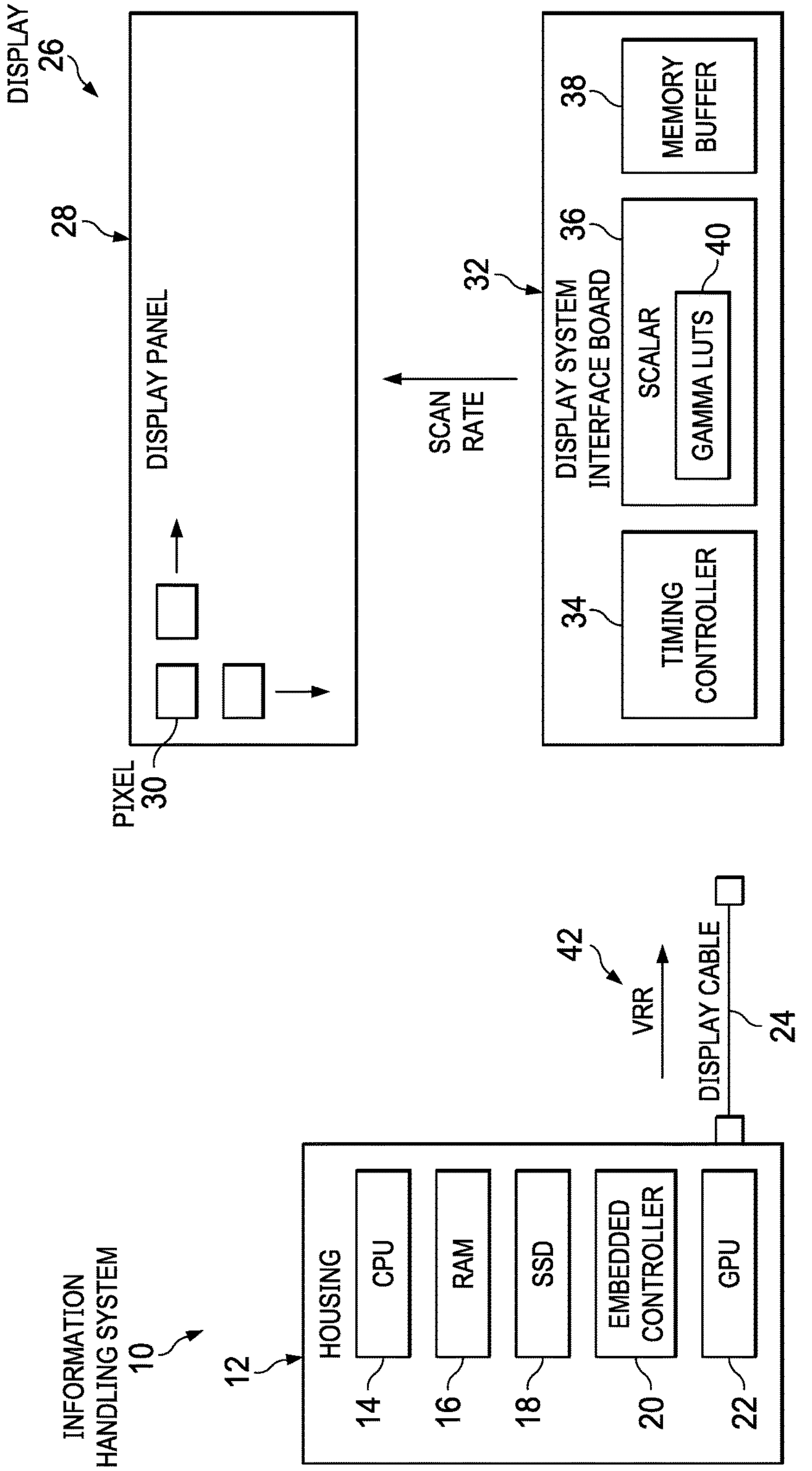
FIG. 1 depicts a block diagram of an information handling system configured to present visual images at a display having variable refresh rates and plural gamma lookup tables.

Referring now to FIG. 1, a block diagram depicts an information handling system 10 configured to present visual images at a display 26 having variable refresh rates and plural gamma lookup tables 40. Information handling system 10 processes information with processing components disposed in a housing 12. In the example embodiment, a central processing unit (CPU) 14 executes instructions that process information with the instructions and information stored in random access memory (RAM) 16. As an example, the instructions include an operating system, such as WINDOWS, and applications, such as gaming applications, stored in persistent non-transitory memory, such as in a solid state drive (SSD) 18, that are retrieved to RAM 16 at power up of the system for execution on CPU 14. An embedded controller 20 manages system physical operating conditions, such as the application of power to the processing components and interactions with input/output devices. A graphics processing unit (GPU) 22 interfaces with CPU 14 and further processes information to define visual images from visual information so that the visual information may be presented at display 26. In the example embodiment, GPU 22 executes in a conventional manner to define pixel values that are communicated to display 26 for presentation as visual images when the pixels each present a color as defined by the pixel values. GPU 22 supports variable refresh rate (VRR) by commanding changes to the refresh rate applied at display 26 to better support presentation of visual images for applications. For example, as a game application changes the frame rate at which visual images are generated, GPU 22 uses VRR commands 42 to adjust the refresh rate of display 26 for presentation of the visual images. Although the example embodiment depicts a desktop information handling system configuration that presents visual images at display 26 by communication through a display cable 24, in alternative embodiments information handling system 10 may have a portable configuration with an integrated display that supports VRR commands by GPU 22 and also supports interactions with peripheral displays.

Display 26 presents visual images with pixels 30 of a display panel 28, with each pixel presenting a color as defined by the pixel values communicated from GPU 22. In the example embodiment, display 26 is a liquid crystal display (LCD) having liquid crystal pixels illuminated by a backlight. In alternative embodiments, alternative types of displays may be used, such as organic light emitting diode (OLED) displays having OLED pixels. A display system interface board 32 of display 26 accepts the pixel values from display cable 24 with a timing controller 34 supported by a scalar 36 and memory buffer 38, and scans the pixel values to pixels 30 at a refresh rate or frequency that is high enough so that the human eye cannot detect discreet changes in color and instead see the image as a whole as a video. For example, timing controller 34 follows a predefined scan pattern to read pixel values from memory buffer 38 and write the pixel values to pixels 30. Scalar 36 provides adjustments to the pixel values so that the GPU generated data accurately depicts the visual image intended by the application given the specific capabilities of display 26. For instance, in various example embodiments, scalar 36 performs resolution correction to adjust pixel values provided from GPU 22 to the resolution of the array of pixels 30 used in display panel 28. In the present example embodiment, scalar 36 performs gamma correction of the pixel values so that the visual image presented at display panel 28 has the luminance and depth intended by the application that defined the visual information.

Scalar 36 helps to prevent undesired flicker in visual images presented at display panel 28 related to changes in luminance of the visual image as variable refresh rate commands 42 are applied to change the refresh rate of pixels 30. For example, if gamma correction applied by scalar 36 is from a single gamma lookup table 40, then each refresh rate will have a slightly different luminance response for the same pixel values, resulting in a flicker of luminance change each time the refresh rate is changed. To help prevent and/or limit variable refresh rate flicker, scalar 36 includes plural gamma lookup tables 40 with each gamma lookup table associated with one or more refresh rates. As a variable refresh rate command 42 is communicated from GPU 22, scalar 36 selects a gamma lookup table 40 associated with the refresh rate and applies the gamma values of the selected gamma lookup table to gamma correct the pixel values and thereby provide a more uniform display luminance through variable refresh rate command applications. In the example embodiment, display system interface board 32 includes timing controller 34 and scalar 40, however, in alternative embodiments alternative arrangements of hardware components may be used, such as mounting timing controller 34 with display panel 28. Further, in various embodiments other processing elements may be used to perform the described functions and the display may be integrated in a portable information handling system and/or a peripheral display device.

Figure 2:
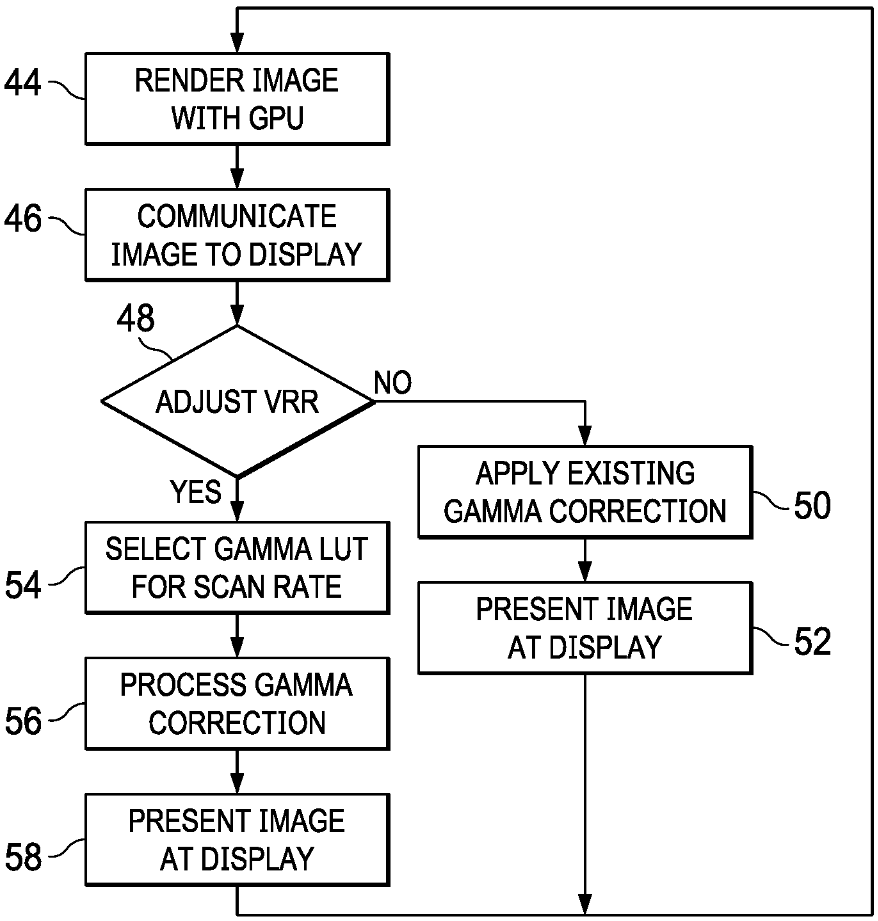
FIG. 2 depicts a flow diagram of a process for selecting a gamma lookup table to apply to a rendered image based upon a selected refresh rate.

Referring now to FIG. 2, a flow diagram depicts a process for selecting a gamma lookup table to apply to a rendered image based upon a selected refresh rate. The process starts at step 44 with rendering of a visual image by a GPU. The process continues to step 46 to communicate the visual image to a display for presentation at the display panel pixels. At step 48 a determination is made of whether an adjustment has been performed of the refresh rate, such as a variable refresh rate command received from a GPU. If not, the process continues to step 50 to apply the scalar's existing gamma correction from the assigned gamma lookup table. At step 52, the visual image is presented at the display using the gamma corrected pixel values. The presentation of a visual image at a display in this manner with a single gamma lookup table is provided by conventional displays with the result that any changes in the refresh rate using only a single gamma lookup table changes the luminance of the visual image presented at step 52 and creates a flicker distortion as the refresh rate changes. To prevent this change in luminance associated with changes in refresh rate, the determination as step 48 is performed so that a gamma lookup table is selected from plural gamma lookup tables that helps to maintain a uniform luminance of the visual image as the variable refresh rates are applied.

At step 48, when a determination is made that a variable refresh rate command has changed the display refresh rate, the process continues to step 54 to change the gamma lookup table used by the scalar for applying gamma correction to generated gamma corrected pixel values for use by the display panel pixels. At step 54 a gamma lookup table is selected for the refresh rate that is commanded for the display. In various embodiments, a gamma lookup table is stored in the scalar for each available display refresh rate. Alternatively, one gamma lookup table might support multiple display refresh rates, such as a range of display rates. At step 56, the gamma correction of the selected gamma lookup table is applied by the scalar to correct the pixel values. At step 58 the visual image is presented at the display with gamma correction applied for the refresh rate in use at the display. The process returns to step 44 to continue presenting visual images with the gamma correction for the selected refresh rate until a refresh rate change command is detected at step 48. By changing the gamma lookup table at each change in refresh rate, a more uniform luminance is provided over time.

Figure 3:
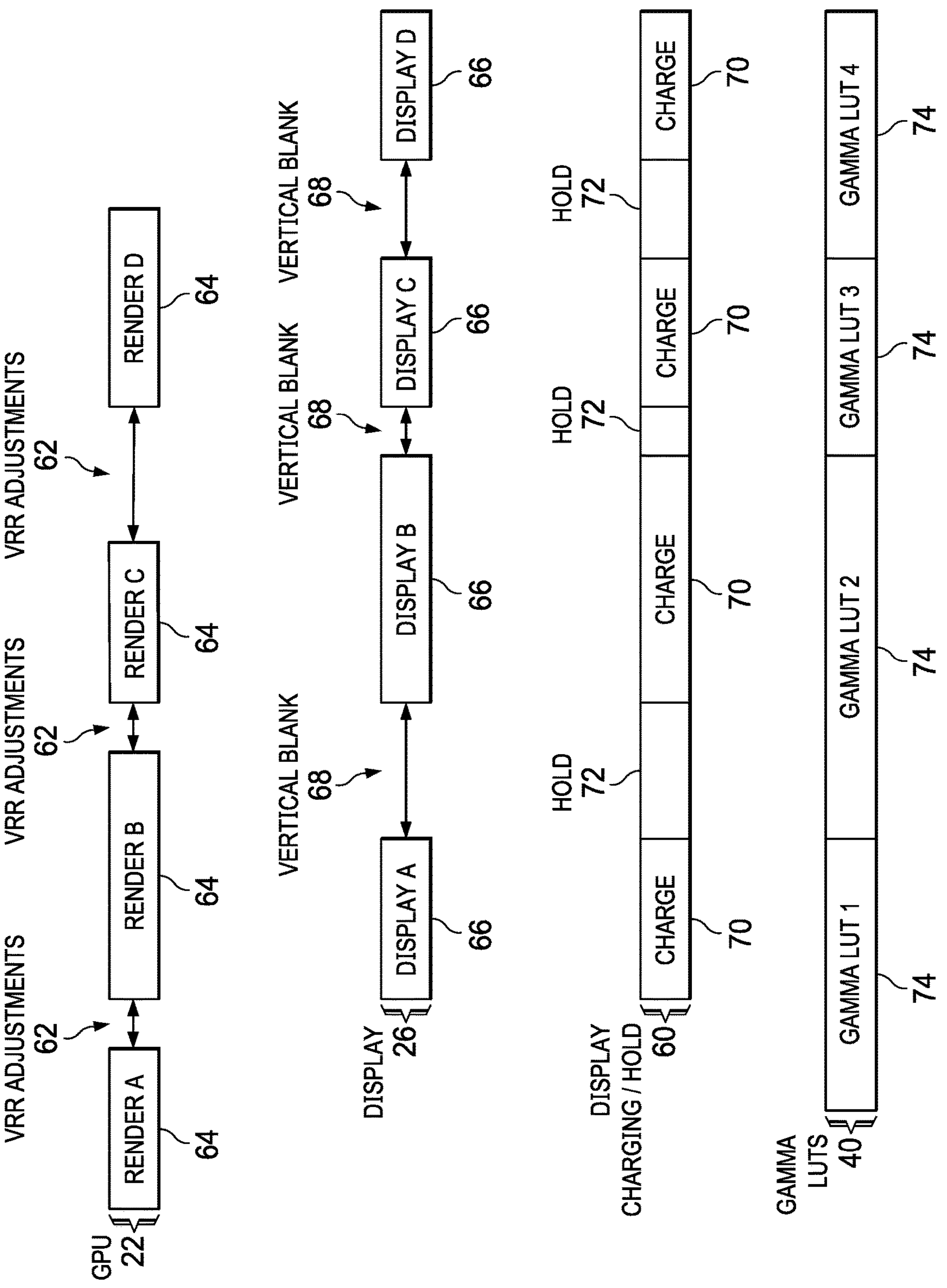
FIG. 3 depicts an example of transitioning between different gamma lookup tables during blanking periods.

Referring now to FIG. 3, an example depicts transitioning between different gamma lookup tables 74 during blanking periods. GPU 22 renders images, depicted at Render A-D 64, that have a variable refresh rate adjustment 62 between them. As an example, the variable refresh rate adjustment 62 is provided by the FreeSync protocol of AMD or the Gsync protocol of nVidia to dynamically change the display refresh rate in response to the rendering frame rate of a gaming application so that visual image rearing and stuttering is avoided. The change in display refresh rate is synchronized to the rendering frame rate by adjusting a vertical blanking period 68 to the changed frame rate. In the example embodiment, display 26 is an LCD display that has a "hold" type of blanking period so that the visual image, shown as Display A-D 66, is held until a next refresh or frame is provided. In the example, display charging/hold 60 shows a charge 70 applied by pixel scans during presentation of Display A-D 66 and a hold 72 of display pixel values during the blanking period 68. The application of the gamma lookup tables 74 is changed in the hold 72 so that when charge 70 is applied to present the visual images, a gamma lookup table 74 associated with the selected refresh rate will be applied. Changing the gamma correction during the blanking period provides a more uniform luminance at the display panel as the pixel values are applied with corrections associated with the selected refresh rate.

Figure 4:
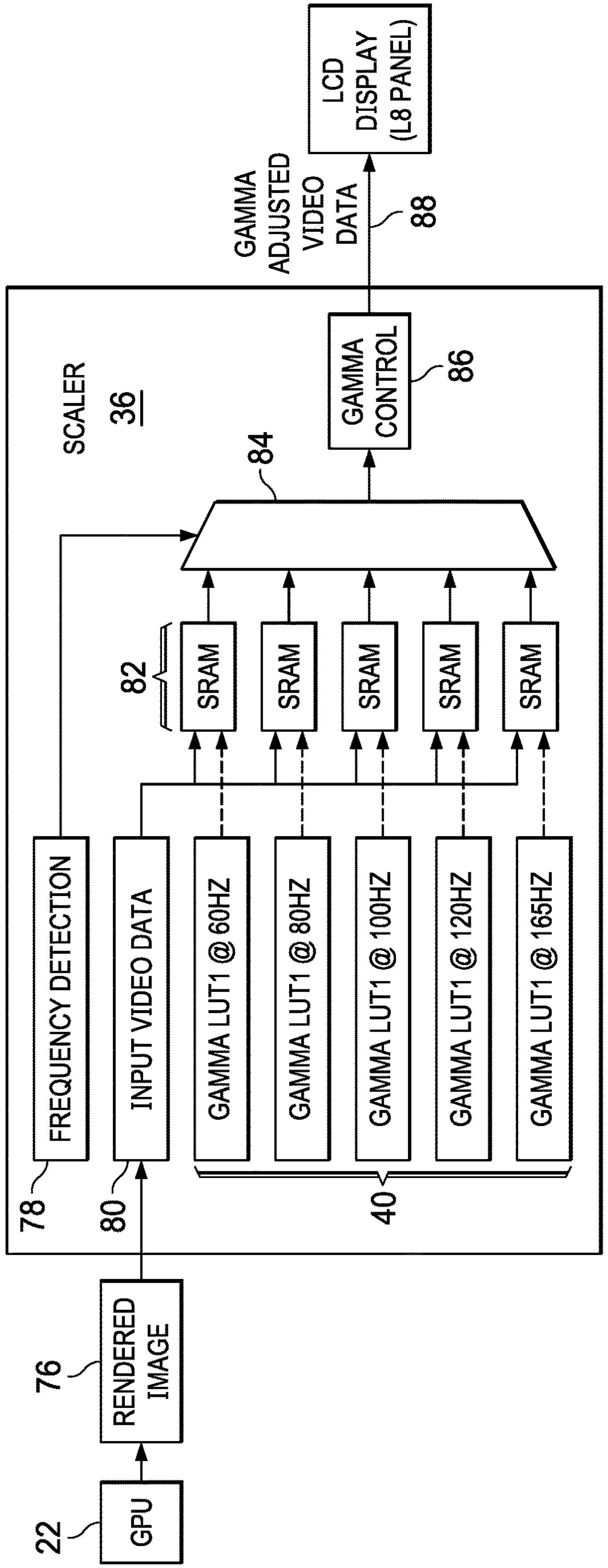
FIG. 4 depicts a block diagram of a scalar having real time gamma control based upon selected refresh rate.

Referring now to FIG. 4, a block diagram depicts a scalar 36 having real time gamma control based upon selected refresh rate. In the example embodiment, the block diagram depicts a real-time gamma control block diagram that chooses a gamma lookup table to compensate for delta luminance based upon the frequency at which the rendered image is scanned to the display panel. GPU 22 communicates a rendered image 76 as video input data 80 to scalar 36. A frequency detection circuit or logic 78 detects the refresh rate selected for rendered image 76 and communicates the refresh rate to a multiplexor 84 as the selection input of the multiplexor that selects one of plural gamma corrected video stream inputs to be the output as the gamma controlled image data 86 provided as the gamma adjusted video data 88 output from the scalar. Rendered image 76 provided to video input data 80 is applied to each of plural gamma lookup tables 40 so that each gamma corrected rendered image is an input to multiplexor 84. In the example embodiment, a separate gamma lookup table 40 is stored in a separate static random access memory (SRAM) 82 for each of the available refresh rates: 60 Hz; 80 Hz; 100 Hz; 120 Hz and 165 Hz. The plural gamma lookup tables 40 and plural SRAMs 82 implement real time gamma adjustment for the rendered image 76 so that the gamma adjusted rendered image for the selected refresh rate is selected at multiplexor 84 as output from scalar 36. Each SRAM 82 supports single instruction gamma adjustment for rendered image 76 based upon the gamma lookup table for real time gamma adjustments that are selected by multiplexor 84 for output to LCD display panel 28.

Figure 5:
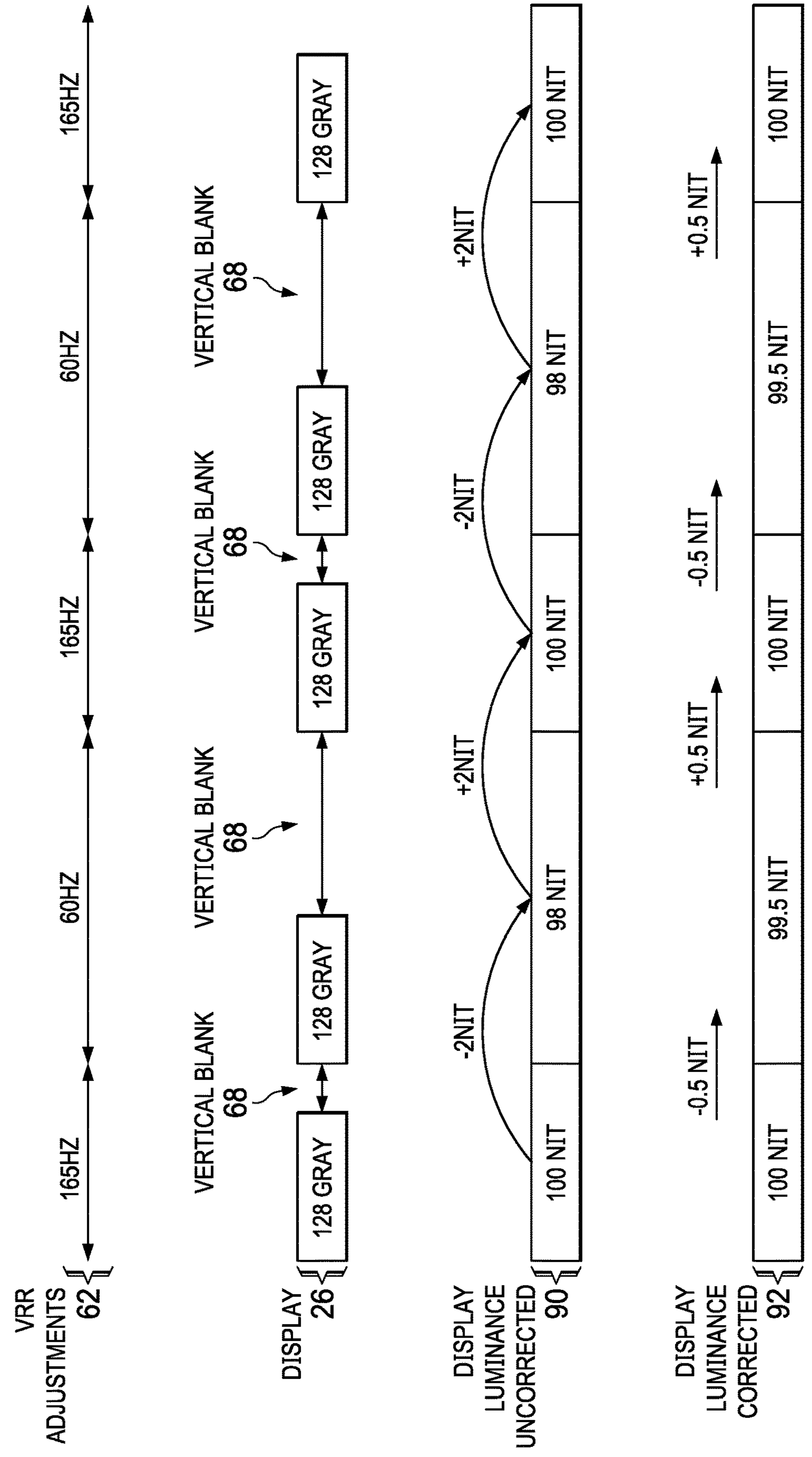
FIG. 5 depicts an example of luminance variance for a constant gamma lookup table versus separate gamma lookup tables selected based upon refresh rate.

Referring now to FIG. 5, an example depicts luminance variance for a constant gamma lookup table versus separate gamma lookup tables selected based upon refresh rate. In the example embodiment, variable refresh rate adjustments 62 are commanded between 165 Hz and 60 Hz refresh rates. Display 26 presents the rendered image with a vertical blanking period 68 defined between each variable refresh rate command. Due to the different vertical blanking durations at different frequencies, the amount of hold time changes based upon the change in the refresh rate, possibly resulting in the change in the luminance of the LCD display panel at the different frequencies. These changes in luminance may be perceived by an end user as a flicker at the display content over time. Display luminance uncorrected 90 illustrates the result of an example of repetitive 128 gray patterns using the same gamma lookup table to perform gamma correction. The luminance for the 60 Hz and 165 Hz refresh rates using the same gamma correction at both refresh rates has 2 nits of greater luminance when using the 165 Hz refresh rate compared to the 60 Hz refresh rate. In contrast, the display luminance corrected 92 applies a first gamma lookup table to correct gamma at the 165 Hz refresh rate and a second gamma lookup table to correct gamma at the 60 Hz refresh rate. By applying gamma correction specific to each refresh rate, a smaller luminance change of only 0.5 nits is generated with each refresh rate change command.

Figure 6A:
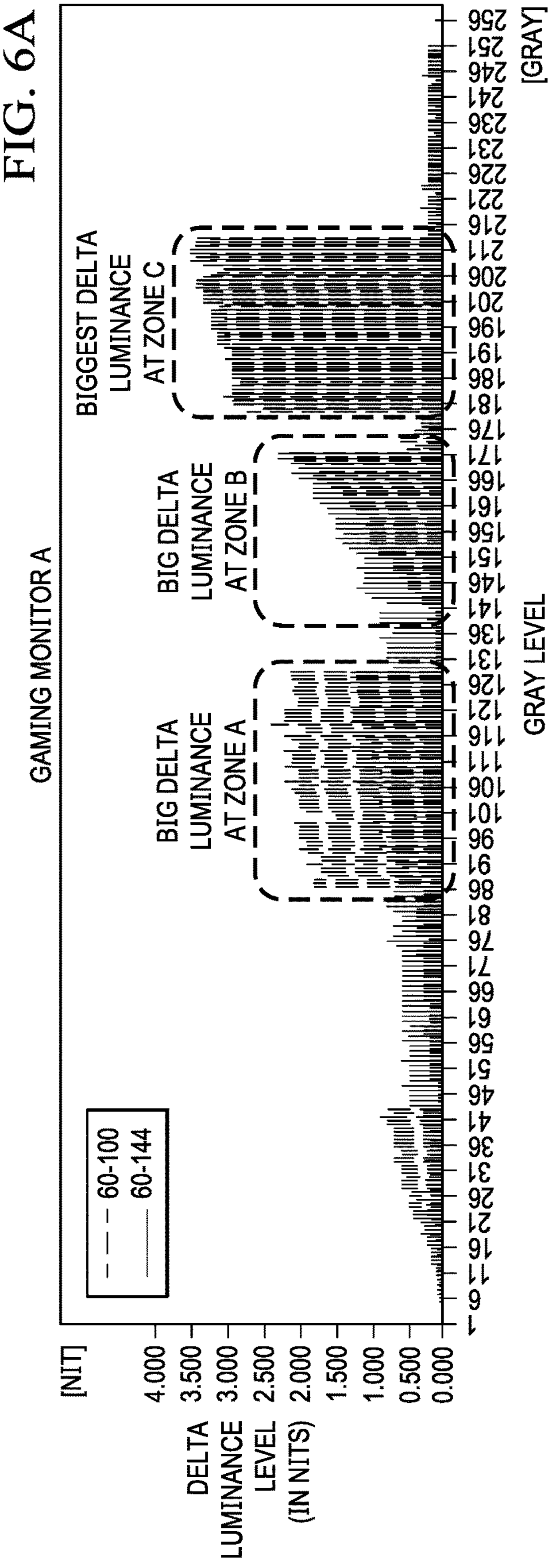
FIGS. 6A and 6B depict examples of luminance variance for a constant gamma lookup table versus separate gamma lookup tables selected based upon refresh rate.
Figure 6B:
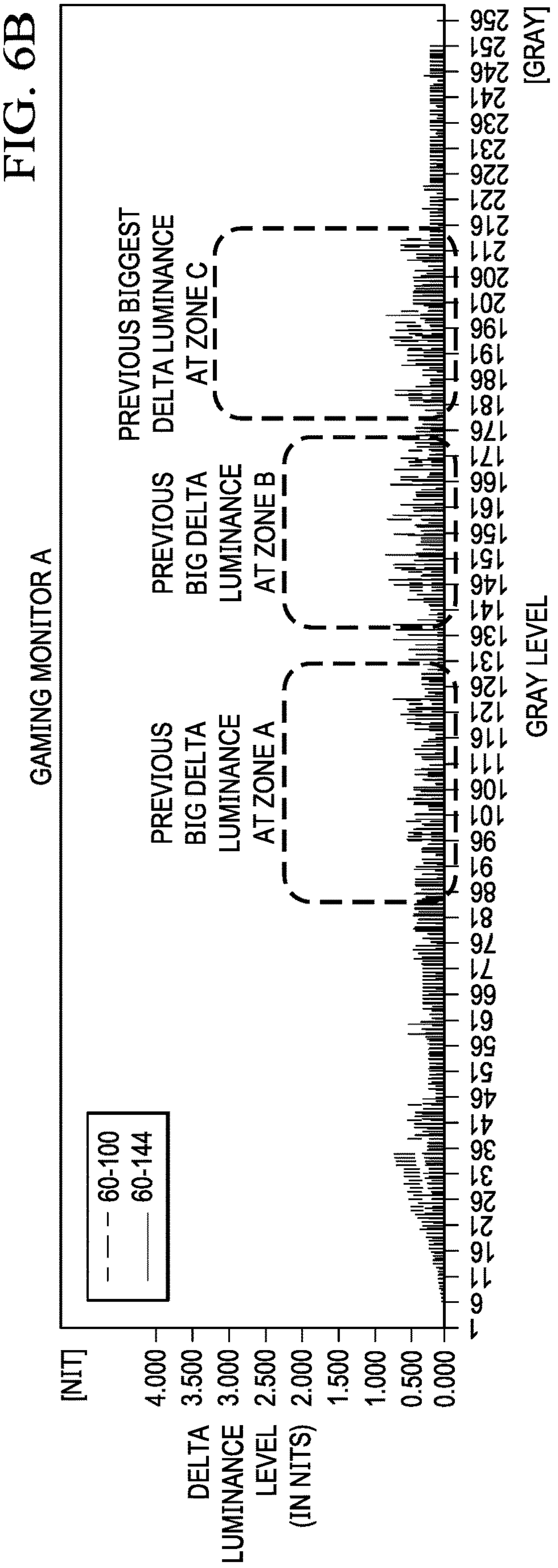

Referring now to FIGS. 6A and 6B, an example depicts luminance variance for a constant gamma lookup table versus separate gamma lookup tables selected based upon refresh rate. FIG. 6A depicts luminance measurement for refresh rates between 60 and 100 Hz and between 60 and 144 Hz at different gray levels from 0 to 255G on an example monitor. A large delta luminance of around 3.5 nit is created in Zone C with a smaller delta luminance in Zones A and B. These luminance differences can be perceived by an end user as a flicker in change of brightness as the refresh rate is updated. FIG. 6B depicts the luminance measurement for the same display with 60 to 100 Hz and 60 to 144 Hz refresh rates at the gray levels 0-255, except that gamma lookup tables are applied for different refresh rates as described above. The three Zones A, B and C have significant improvements in luminance variance of less than 1 nit compared with the example of FIG. 6A that uses only a single gamma lookup table.

Figure 7A:
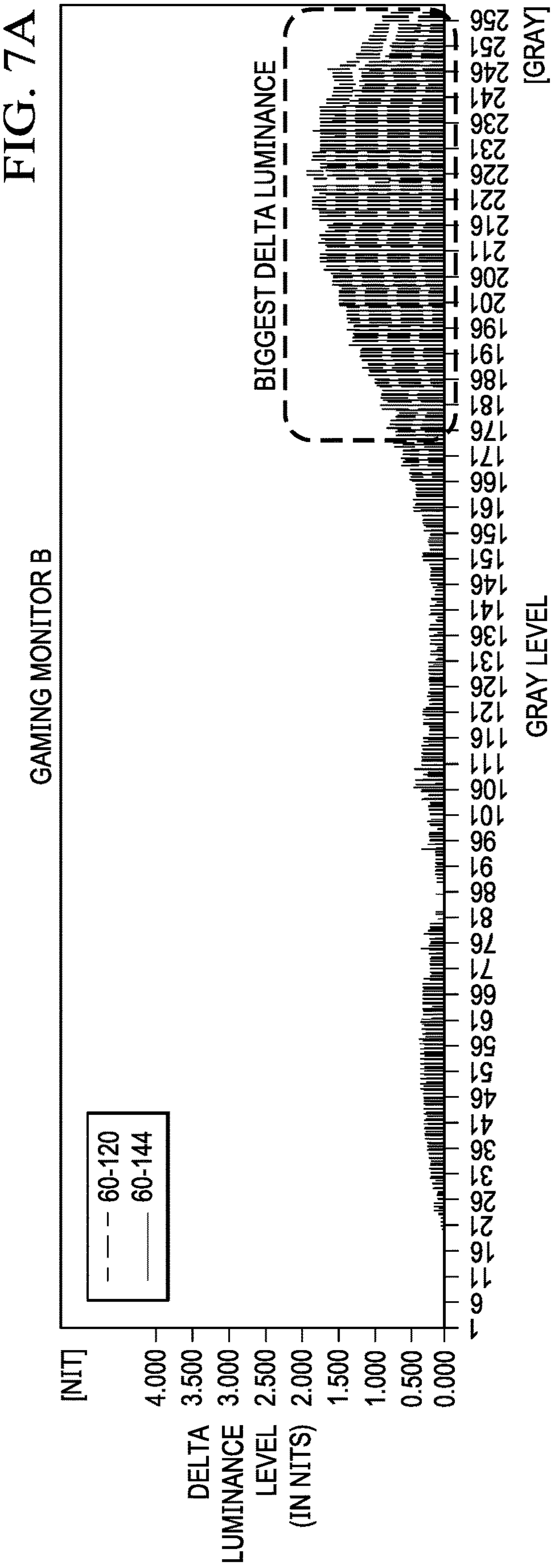
FIGS. 7A and 7B depict another example of luminance variance for a constant gamma lookup table versus separate gamma lookup tables selected based upon refresh rate.
Figure 7B:
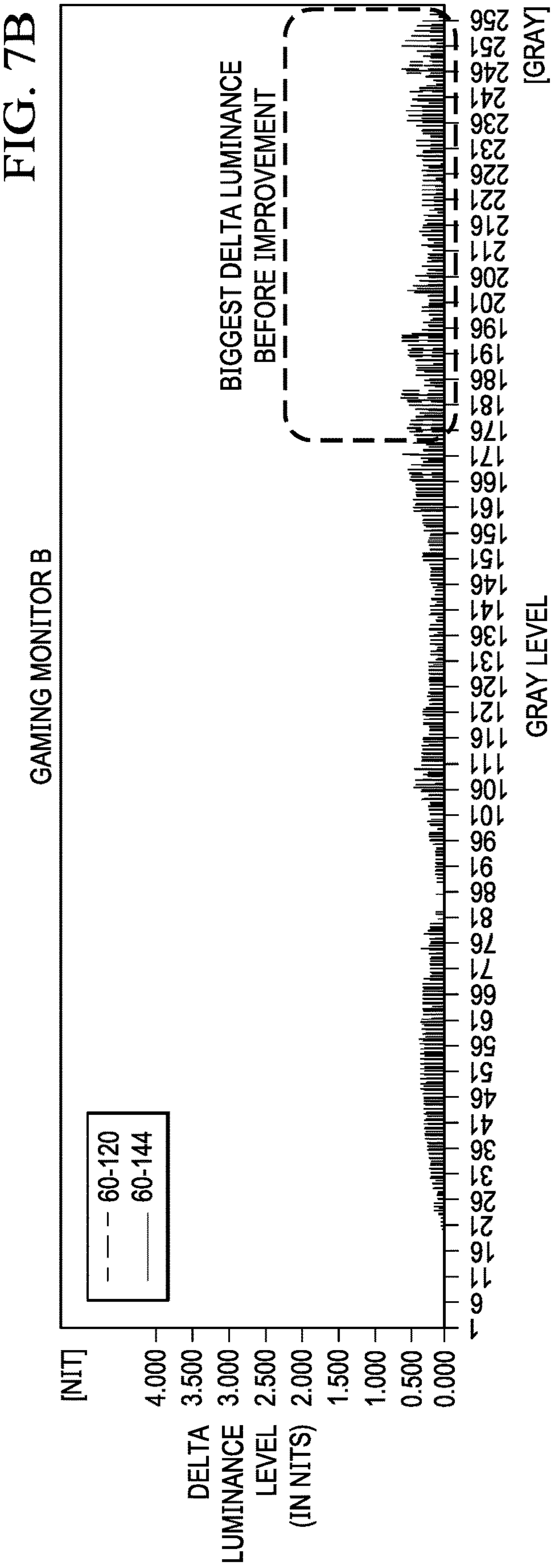

Referring now to FIGS. 7A and 7B, another example depicts luminance variance for a constant gamma lookup table versus separate gamma lookup tables selected based upon refresh rate. The display of FIG. 7A is different from that of FIG. 6A but uses a single gamma lookup table to perform gamma correction. In this example display a large delta in luminance is experienced above 175G with a variance in luminance approaching 2 nits. In contrast, FIG. 7B show the display of FIG. 7A applying plural gamma lookup tables to maintain a more uniform luminance at the different refresh rates.

Although the present invention has been described in detail, it should be understood that various changes, substitutions and alterations can be made hereto without departing from the spirit and scope of the invention as defined by the appended claims.

What is claimed is:

1. An information handling system comprising:

a processor operable to execute instructions that process information to generate visual information for presentation at a display;

a memory interfaced with the processor and operable to store the instructions, the information and the visual information;

a graphics processing unit interfaced with the processor and memory and operable to further process the visual information to define pixel values for application at pixels of a display panel to present a visual image defined by the visual information, the graphics processing unit further operable to command a variable refresh rate for application of the pixel values to the pixels, the variable refresh rate including at least a first and second refresh rate;

a display interfaced with the graphics processing unit and having plural pixels that generate colors to present the visual image based upon the pixel values;

a scalar included with the display, the scalar having a multiplexor with plural inputs and a gamma adjusted output, each of the plural inputs including the pixel values, each of the plural inputs interfaced with a SRAM, the scalar applying values of a first gamma lookup table to adjust the pixel values to first adjusted pixel values with the first refresh rate and applying values of a second gamma lookup table to adjust the pixel values to second adjusted pixel values with the second refresh rate, the multiplexor having a selector to select one of the plural inputs as the gamma adjusted output, each of the plural inputs associated with a refresh rate;

a first SRAM of the scalar storing the first gamma lookup table, the scalar multiplexor selecting the SRAM having the first gamma lookup table as the input for the gamma adjusted output when the first refresh rate is commanded from the graphics processing unit; and a second SRAM of the scalar storing the second lookup table, the scalar multiplexor selecting the SRAM having the second gamma lookup table as the input for the gamma adjusted output when the second refresh rate is communicated from the graphics processing unit.

2. The information handling system of claim 1 wherein a change from the first to second refresh rate is performed by inserting a blanking period between the presentation of pixel values with the first refresh rate and the second refresh rate and the second gamma lookup table is applied during the blanking period.

3. The information handling system of claim 2 wherein the display comprises a liquid crystal display panel having liquid crystal display pixels.

4. The information handling system of claim 3 further comprising a gaming application executing on the processor and having a variable rendering frame rate, the graphics processing unit commanding a variable refresh rate associated with the variable rendering frame rate.

5. The information handling system of claim 1 wherein:

the display has plural refresh rates to scan pixel values to the pixels; and the scalar stores a separate gamma lookup table for application with each of the plural refresh rates.

6. The information handling system of claim 5 wherein each separate gamma lookup table is stored in a separate SRAM of the scalar.

7. The information handling system of claim 5 wherein the display synchronizes a refresh rate with a rendering frame rate of an application by adjusting a blanking period.

8. A method for presenting visual images at a display, the method comprising:

presenting visual information at the display with a first refresh rate;

applying a first gamma lookup table to a first multiplexor input from a first SRAM to adjust the visual information for presentation at the first refresh rate;

commanding presenting of the visual information with a second refresh rate to a selector of the multiplexor;

in response to the commanding, applying a second gamma lookup table to a second multiplexor input from a second SRAM to adjust the visual information for presentation at the second refresh rate;

presenting the visual information at the display with the second refresh rate;

storing the first gamma lookup table in the first SRAM, the first SRAM integrated in a scalar of the display;

storing the second gamma lookup table in the second SRAM, the second SRAM integrated in the scalar; and integrating the multiplexor in the scalar having plural inputs that accept the visual information, one of the inputs interfacing with the first SRAM and one of the inputs interfacing with the second SRAM, the multiplexor configured to have each input selected as an output with gamma adjusted visual information by a single command to the multiplexor selector.

9. The method of claim 8 further comprising:

applying a blanking period between the presenting the visual information with the first refresh rate and the presenting the visual information with the second refresh rate; and changing from the first gamma lookup table to the second gamma lookup table during the blanking period.

10. The method of claim 9 wherein the display refresh rate synchronizes with a rendering frame rate by adjusting the blanking period.

11. The method of claim 8 further comprising:

applying the commanding presenting of the visual information with a second refresh rate as an input to a multiplexor of the scalar; and in response, changing the multiplexor output from an application of the visual information to the first SRAM to an application of the visual information to the second SRAM.

12. The method of claim 8 further comprising:

integrating a separate SRAM in a scalar of the display for each refresh rate; and storing in each of the separate SRAMs a gamma lookup table associated with a separate one of the refresh rates.

13. The method of claim 12 wherein for each refresh rate the associated gamma lookup table adjusts the visual information to present with a uniform luminance.

14. A display scalar comprising:

a video input configured to accept a rendered image and refresh rate from a graphics processing unit;

a first gamma lookup table associated with a first refresh rate stored in a first SRAM integrated in the scalar;

a second gamma lookup table associated with a second refresh rate stored in a second SRAM integrated in the scalar;

logic device integrated in the scalar and operable to apply the first gamma lookup table and the rendered image to a first input, to apply the second gamma lookup table and the rendered image to a second input, to select the first input as a gamma adjusted output when the first refresh rate is selected, and to select the second input as the gamma adjusted output when the second refresh rate is selected, each of the first and second inputs prepared for selection with each rendered image frame.

15. The display scalar of claim 14 wherein the logic device comprises a multiplexor having the first gamma lookup table applied to the rendered image as a first input, the second gamma lookup table applied to the rendered image as a second input, and the refresh rate as a selector input that defines whether the first input or second input is selected as an output to display pixels.

16. The display scalar of claim 14 integrating a separate SRAM to store a separate gamma lookup table for each of plural refresh rates supported by a display.

* * * * *